Oct. 4, 1949.
J. B. ARMITAGE ET AL
2,483,451
MACHINE TOOL SPINDLE
Original Filed Jan. 6, 1941
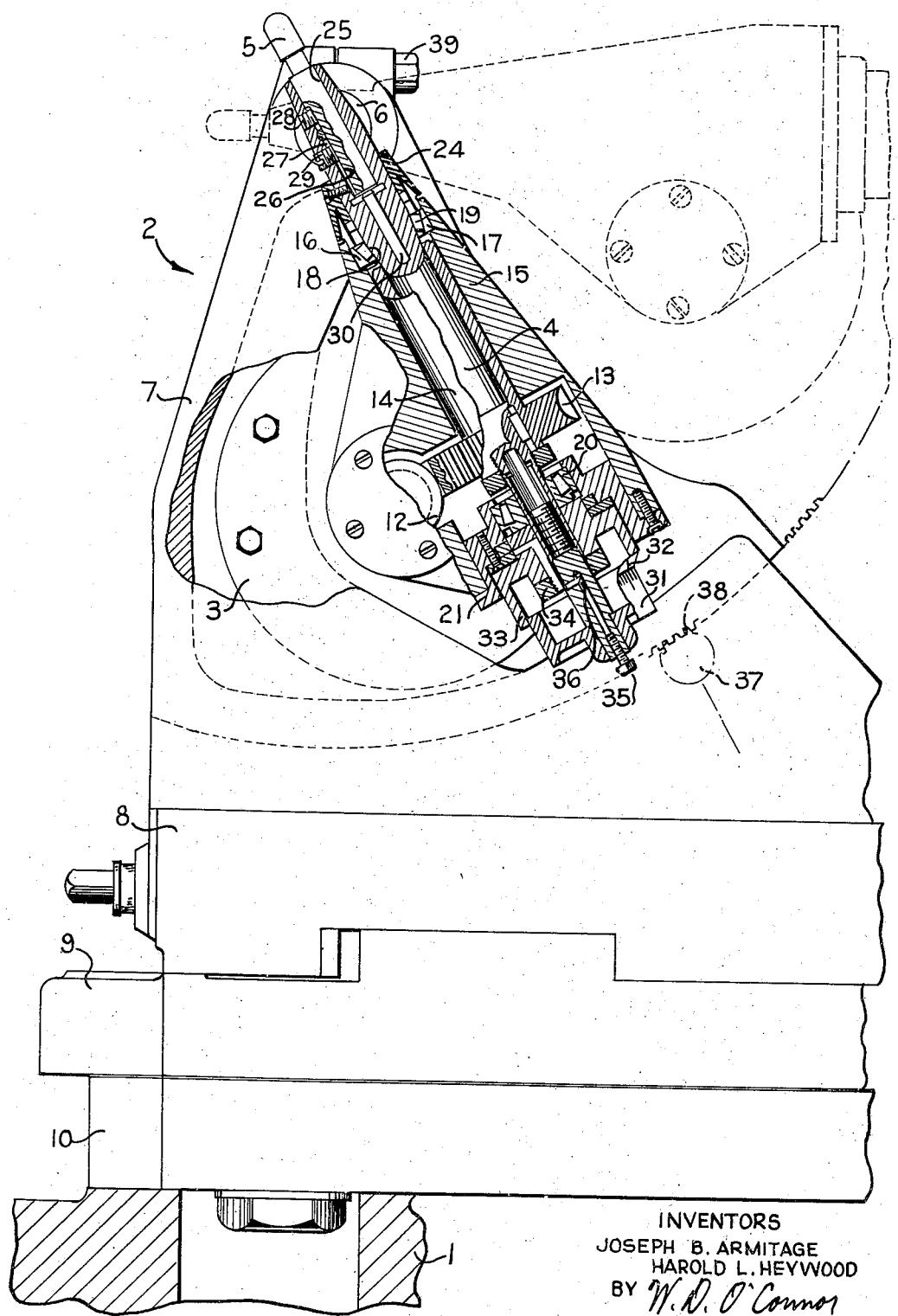
INVENTORS
JOSEPH B. ARMITAGE
HAROLD L. HEYWOOD
BY W. D. O'Connor
ATTORNEY Patented Oct. 4, 1949

2,483,451

UNITED STATES PATENT OFFICE 2,483,451

MACHINE TOOL SPINDLE

Joseph B. Armitage, Wauwatosa, and Harold L. Heywood, West Allis, Wis., assignors to Kearney & Trecker Corporation, West Allis, Wis., a corporation of Wisconsin Original application January 6, 1941, Serial No. 373,274, now Patent No. 2,392,963, dated January 15, 1946. Divided and this application December 8, 1945, Serial No. 633,659

10 Claims. (Cl. 90—11)

This invention relates generally to machine tools and more particularly to improved supporting and adjusting means for a machine tool spindle.

This specification constitutes a division of application Serial No. 373,274, filed January 6, 1941, that issued January 15, 1946, as Patent No. 2,392,963, which in turn, was a continuation-in-part of application Serial No. 115,650, filed December 14, 1936, that issued January 7, 1941, as Patent No. 2,227,620.

A general object of the invention is to provide an improved machine tool spindle mechanism.

Another object of the invention is to provide an improved milling machine cutter supporting spindle that is especially adapted for performing milling operations in positions difficult of access.

Another object is to provide an improved adjusting mechanism for positioning a milling cutter longitudinally relative to its supporting spindle.

According to this invention, an improved cutter carrying spindle for a milling machine especially adapted to perform milling operations in restricted spaces is provided with cutter retaining means arranged to effect precise axial adjustment of the cutters within the spindles. The several spindles of the machine are arranged for operating close together in a restricted space, each being carried by a tapered housing and supported at its forward end by an anti-friction bearing of small diameter having its inner race formed integrally with the spindle. An end milling cutter is fitted in the end of each spindle and apparatus is provided for adjusting the cutter longitudinally of the spindle, there being a micrometer dial for accurately positioning the cutter and a locking device for holding it in an adjusted position. The spindles are movably supported for actuation by transmission mechanism in a manner to move the cutters along either an arcuate or a linear path of cutting action.

The foregoing and other objects of this invention, which will become more fully apparent from the following detailed description of an embodiment thereof, may be achieved by the apparatus herein described by way of example in connection with the illustration of its structural components in the accompanying drawing, in which the single figure is a view partly in elevation and partly in section of a tool supporting and driving mechanism embodying the invention.

The structure illustrated in the drawing as constituting apparatus disclosing the invention is a tool retaining spindle of a milling machine, such as the machine disclosed in the aforementioned patent, although the spindle structure may be utilized in connection with other machines.

Referring more specifically to the drawing, the spindle carrying structure there shown comprises, in general, a machine base or bed 1 having a way surface to slidably receive a cutter supporting and driving mechanism or head 2 disposed to cooperate with another similar spindle mechanism and a work supporting element (not shown) operably mounted on the bed 1 in the manner fully described in the previously mentioned Patent No. 2,227,620.

The cutter supporting head 2 includes a driving motor 3 operatively connected to drive a tool spindle 4, which carries at its upper end an end milling cutter 5 in a position to operate upon a workpiece held by a work supporting element (not shown). Since, as explained in the previously mentioned patent, the workpiece surfaces to be machined are disposed within cavities difficult of access and are of non-linear contour, it is necessary that the cutter supporting apparatus be made adjustable to present each of the two cutters of the machine to the work at a suitable angle and to move the cutters along predetermined paths to form the desired contoured surfaces. To this end, each cutter supporting spindle 4 is of tapered construction to permit operation of the two cutters in close proximity to each other, and each driving motor 3 and its associated spindle 4 is mounted in a unitary frame that is so supported as to be adjustable in several directions.

The frame of each driving motor 3 carries its associated spindle 4 and is suspended at its top from a pivotal supporting pin 6, in such manner that it may be swung through an arc to change the angle of presentation of the cutter 5, as is indicated by the dotted outline showing the motor frame tilted to its extreme upper position. The pivot pin 6 is supported by a bracket or cradle 7 that is slidably mounted for movement forward or backward relative to the machine base 1 upon a cutter carrying slide 8. The slide 8 is movably disposed upon a pivotally mounted oscillating section or rotary base 9, which, in turn, is rotatably supported upon a main slide 10 that slidably engages the way of the bed 1. A manual and a power drive is provided to effect movement of the cutter supporting head 2 through a cutting stroke, as is fully described in the aforementioned patent.

The driving mechanism for rotating the cutter supporting spindle 4 comprises a worm 12 secured on the shaft of the motor 3 and that meshes with a worm wheel 13 fixed on the spindle 4. The worm wheel 13 is provided with a relatively long sleeve or elongated hub 14 encircling the spindle 4 and constituting a reinforcing member for stiffening the spindle. The spindle 4 is rotatably supported within a tapered housing 15 that is attached to and constitutes part of the frame supporting the motor 3 and moves therewith as a unit in pivoting about the pivotal supporting pin 6.

In order that the two spindles of the milling machine may operate close together in performing certain milling operations, the housing 15 of each spindle is made in a shape tapering or converging toward the projecting cutter supporting end of the spindle. As near as possible to the cutter receiving end of the spindle, there is provided an anti-friction bearing 16 comprising an outer race 17 mounted in the tapered end of the housing and an inner race 18 formed integrally with the spindle, together with cooperating antifriction rollers 19 disposed between the outer and inner races. By forming the inner race integrally with the spindle, the diameter of the bearing 16 is reduced to the minimum and it is possible to place it nearer to the cutter receiving end of the spindle then would be the case if the inner race were formed separately and fitted over the spindle. The spindle 4 is supported at its other end by an anti-friction bearing 20 carried in a cap 21 fitted in the other end of the housing 15. The projecting cutter receiving end of the spindle is of tapered external contour, and is provided with a tapered shield 24 protecting the bearing and with a cylindrical cutter shank receiving socket 25 for receiving the cutter 5. The shank of the cutter 5 is provided with a flat side 26 that engages a driving key 27 in the spindle to prevent rotation of the cutter relative to the spindle. Two set screws 28 and 29 are provided in the spindle for engaging the flat surface 26 of the cutter shank to retain the cutter in the socket 25 at any desired position longitudinally thereof.

To provide for positioning the cutters 5 longitudinally relative to the spindle 4 in effecting adjustment of the mechanism for performing a predetermined milling operation or to compensate for a change in the length of the cutter resulting from sharpening it, there is provided a positioning or adjusting rod 30 extending longitudinally through a central bore of the spindle 4 and arranged to engage with its forward end the inner end of the cutter shank. The rod or locating bar 30 has threaded engagement with the other end of the spindle in such manner that rotation of the rod relative to the spindle results in adjusting the cutter 5 longitudinally of the spindle. For indicating the amount of movement of the cutter relative to the spindle, the adjusting rod 30 is provided at its outer end with a cylindrical micrometer indicating dial 31 having graduations disposed to cooperate with an indicating pointer 32 on a cylindrical member 33 in such manner that the cutter may be moved either inwardly or outwardly by a predetermined increment. The cylindrical member 33 is mounted to rotate with the spindle 4 and serves as a spacer between the spindle bearing 20 and a locking nut 34, which is threaded on the spindle. Thus, by positioning the nut 34, the bearing 20 may be precisely adjusted. After the cutter 5 has been adjusted, it may be locked in position by tightening the set screws 28 and 29 and the positioning rod or locating bar 30 may be locked in position by tightening a locking screw 35 threaded in the exposed end thereof and acting upon a radially disposed locking pin 36 that engages the spindle.

For positioning the cutter 5 angularly to adapt it for engaging a workpiece, the cutter driving unit may be pivoted about the pivotal supporting pin 6, by means of a pinion 37 that is disposed to mesh with a gear segment 38 formed on the lower arcuate edge of the frame or housing supporting the motor 3 and the spindle 4. After the cutter spindle has been adjusted to the desired inclination, it may be clamped in position by tightening a bolt 39 to clamp the motor frame to the pivot pin 6. To machine a desired arcuate contour on a workpiece, the cutter 5 is set at a proper angle to engage the work and at the proper distance from the pivot axis of the rotary base 9 by the various adjustments, as more fully explained in the aforementioned patent.

Although a specific form of the invention has been described in detail in order to disclose clearly the several features of the invention, it is to be understood that the particular apparatus shown and described is susceptible of various modifications, which will be apparent to those skilled in the art, without departing from the spirit and scope of the invention, as defined in the subjoined claims.

The principles of the invention having now been fully explained in connection with the foregoing description of an illustrative preferred embodying structure, we hereby claim as our invention or discovery:

1. In a cutter supporting structure for operating in a restricted space, the combination with a spindle supporting housing presenting a convergingly tapered forward end and a cutter spindle rotatably mounted in said supporting housing and presenting a similarly tapered forward end disposed to project from said tapered end of said housing and having a socket for receiving a cutter shank, of bearings for rotatably supporting said spindle in said housing including an anti-friction bearing at the forward end comprising an outer race supported in said tapered forward end of said housing, an inner race formed integrally on said spindle within said tapered housing end, and a plurality of anti-friction rollers interposed between said outer and said inner races, whereby said bearing is positioned to provide support close to the forward tapered end of said spindle.

2. In a milling machine cutter supporting structure adapted to support an end milling cutter for operation in close quarters, the combination with a cutter driving mechanism including a spindle supporting housing adapted to rotatably support a spindle and shaped to present a forward end of reduced diameter, of a tool supporting spindle journalled in said housing and presenting a convergingly tapered forward end disposed to project from said reduced diameter end of said housing, anti-friction bearings journalling said spindle in said housing including a bearing supporting the forward end of said spindle and having its inner race formed integrally with said spindle to provide a bearing of small diameter adapted to fit within the reduced diameter forward end of said spindle housing, means on the forward end of said spindle for securing an end mill, and means extending through said spindle and operative from the other end thereof for adjusting the longitudinal position of said end mill relative to said spindle.

3. In a cutter support for a milling machine, the combination with a rotatably mounted cutter spindle having a cylindrical socket in its forward end for slidably receiving a cutter shank and means for retaining a cutter shank in adjusted position in said socket, said spindle having a bore extending longitudinally from said socket to the other end thereof, of cutter positioning means for adjusting the longitudinal position of a cutter relative to said spindle, comprising a locating bar extending through said longitudinal bore of said spindle and having threaded engagement with said spindle in manner to provide for longitudinal adjustment relative thereto, said locating bar being disposed to engage the end of a cutter shank in said socket in manner to position the cutter longitudinally relative to said spindle.

4. In a cutter support for a milling machine, the combination with a rotatably mounted cutter spindle having a socket in its forward end for receiving a cutter shank and means for retaining a cutter in said socket, said spindle having a bore extending longitudinally from said socket to the other end thereof, of cutter positioning means for adjusting the longitudinal position of a cutter relative to said spindle, comprising a locating bar extending through said longitudinal bore of said spindle and having threaded engagement with said spindle in manner to provide for longitudinal adjustment relative thereto, said locating bar being disposed to engage the end of a cutter shank in said socket in manner to position the cutter longitudinally relative to said spindle upon rotation of said bar, a micrometer dial indicating means associated with said threaded locating bar for indicating change in position of said cutter, and means for locking said locating bar in adjusted position in said spindle, whereby said spindle, said locating bar, and said micrometer dial may be rotated as a unit without changing the adjustment of said cutter or the indication of said dial.

5. A supporting structure for a machine tool comprising a spindle supporting housing, a rotatably mounted spindle in said supporting housing, a power drive means to effect rotation of said spindle, a longitudinal receiving bore at one end of said spindle, a shank member receivable in said bore, a central bore in said spindle concentric with said receiving bore, an adjusting rod disposed in said central bore to abut said shank member, an adjusting means engaging said rod, a dial bearing indicia operably mounted on said adjusting means, a locking means disposed to lock said adjusting means in an adjusted position, and a clamping means to clamp said shank member in any adjusted position.

6. In a milling machine, a hollow cutter carrying spindle presenting a cutter receiving socket, an adjusting rod threaded in said hollow spindle in such manner that one end may engage a cutter in said socket while the other end projects from the opposite end of said spindle, a micrometer dial connected to said adjusting rod and operative to indicate changes in axial position of said rod and the cutter, a locking pin disposed radially of said adjusting rod, and a locking screw threaded in the projecting end of said adjusting rod and cooperating with said locking pin in manner to operate when tightened to force said pin into locking engagement with said spindle.

7. In a milling machine especially adapted to operate in restricted spaces, a tapered spindle carrying housing, a cutter carrying spindle rotatably mounted in said housing with its cutter receiving end projecting from the small end of said tapered housing, and means to drive said spindle including a gear wheel having an elongated hub extension at one end thereof, said gear wheel being mounted on said spindle within the large end of said tapered housing with said elongated hub extension engaging and reenforcing said spindle along the portion thereof extending toward said small end of said housing.

8. In a cutter support for a milling machine, the combination with a rotatably mounted cutter spindle having a socket in its forward end for slidably receiving a cutter shank and means for retaining a cutter shank in adjusted position in said socket, said spindle having a bore extending longitudinally from said socket to the other end thereof, of cutter positioning means for adjusting the longitudinal position of a cutter shank in said socket relative to said spindle, said means comprising a locating bar extending through said longitudinal bore of said spindle and having threaded engagement with said spindle in manner to provide for longitudinal adjustment relative thereto, said locating bar being disposed to engage the end of a cutter shank in said socket in manner to position the cutter longitudinally relative to said spindle upon rotation of said bar, and means for locking said locating bar in adjusted position in said spindle, whereby said spindle and said locating bar may be rotated as a unit without changing the adjustment of said cutter.

9. A supporting structure for a machine tool, comprising a spindle supporting housing, a spindle rotatably mounted in said supporting housing, said spindle having a longitudinal shank receiving bore at one end thereof and a central bore concentric with said shank receiving bore, a shank member receivable in said shank receiving bore, an adjusting rod disposed in said central bore to abut said shank member, an adjusting means engaging said rod, a dial bearing indicia operably mounted on said adjusting means, a locking means disposed to lock said adjusting means in an adjusted position indicated by said dial, and a clamping means disposed to clamp said shank member in any adjusted position.

10. In a milling machine, a hollow cutter carrying spindle presenting a cutter receiving socket in one end, an adjusting rod threaded in said hollow spindle in such manner that one end thereof engages a cutter slidably received in said socket while the other end projects from the opposite end of said spindle, a micrometer dial connected to said projecting end of said adjusting rod and operative to indicate changes in axial position of said rod when turned to adjust the position of a cutter in said socket, and a locking device on the projecting end of said adjusting rod arranged for cooperating with said spindle in manner to operate selectively to effect locking engagement between said adjusting rod and said spindle for holding the cutter in adjusted position.

JOSEPH B. ARMITAGE.
HAROLD L. HEYWOOD.

REFERENCES CITED

The following references are of record in the file of this patent:

UNITED STATES PATENTS

| Number | Name | Date |
| --- | --- | --- |
| 931,761 | Henrikson | Aug. 24, 1909 |
| 1,873,376 | Forward | Aug. 23, 1932 |
| 1,971,299 | Fickett et al. | Aug. 21, 1934 |
| 2,115,058 | Armitage | Apr. 26, 1938 |